US009866798B2

(12) United States Patent
Watanabe

(10) Patent No.: US 9,866,798 B2
(45) Date of Patent: Jan. 9, 2018

(54) IMAGE PROCESSING APPARATUS, METHOD AND PROGRAM FOR CONTROLLING AN IMAGE PROCESSING APPARATUS BASED ON DETECTED USER MOVEMENT

(71) Applicant: Genki Watanabe, Kanagawa (JP)

(72) Inventor: Genki Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 162 days.

(21) Appl. No.: 14/849,700

(22) Filed: Sep. 10, 2015

(65) Prior Publication Data

US 2016/0094783 A1 Mar. 31, 2016

(30) Foreign Application Priority Data

Sep. 26, 2014 (JP) ................................ 2014-196138

(51) Int. Cl.

*H04N 19/00* (2014.01)
*H04N 1/00* (2006.01)
*H04N 7/18* (2006.01)
*G06F 3/01* (2006.01)
*G06K 9/00* (2006.01)
*G03G 15/00* (2006.01)
*G06F 1/32* (2006.01)

(52) U.S. Cl.

CPC ......... *H04N 7/181* (2013.01); *G03G 15/5004* (2013.01); *G03G 15/5016* (2013.01); *G06F 1/3231* (2013.01); *G06F 3/017* (2013.01); *G06K 9/00335* (2013.01); *G06K 9/00342* (2013.01); *H04N 1/00888* (2013.01); *H04N 2201/0094* (2013.01); *Y02B 60/1289* (2013.01)

(58) Field of Classification Search

None

See application file for complete search history.

(56) References Cited

U.S. PATENT DOCUMENTS 8,018,579 B1 * 9/2011 Krah ..................... G01B 11/00 356/4.01
2008/0123975 A1 5/2008 Otsu et al.
(Continued)

FOREIGN PATENT DOCUMENTS

| | | |
|---|---|---|
| JP | H11-355779 | 12/1999 |
| JP | 2006-079272 | 3/2006 |
| JP | 2013-085038 | 5/2013 |

OTHER PUBLICATIONS

Extended European Search Report dated May 9, 2016.

*Primary Examiner* — Kevin McInnish
(74) *Attorney, Agent, or Firm* — Harness, Dickey & Pierce, P.L.C.

(57) ABSTRACT

There is provided an image processing apparatus comprising: a capturing part configured to sequentially capture a plurality of images; an extracting part configured to extract movement information from the sequentially captured images through an analysis, wherein the movement information relates to movement of a moving object and the sequentially captured images contain images of the moving object; and a first determining part configured to detect an approaching user based on the extracted movement information and approaching movement information, stored in advance, indicating approaching movement of a human.

18 Claims, 11 Drawing Sheets

START
S401 CAPTURE IMAGES
S402 EXTRACT MOVEMENT INFORMATION
S403 MOVEMENT OF HUMAN? NO / YES
S404 APPROACHING MOVEMENT? NO / YES
S405 TRANSITION INTO STATE FOR USING APPARATUS
END

(56) References Cited

U.S. PATENT DOCUMENTS

| | | | |
|---|---|---|---|
| 2009/0079813 A1 | 3/2009 | Hildreth | |
| 2011/0175810 A1 | 7/2011 | Markovic et al. | |
| 2012/0114176 A1* | 5/2012 | Kawano | G06K 9/00771 382/103 |
| 2014/0104636 A1 | 4/2014 | Baba | |
| 2014/0253431 A1 | 9/2014 | Gossweiler, III et al. | |
| 2015/0199574 A1* | 7/2015 | Kato | G06K 9/6202 382/218 |

* cited by examiner 100
110
RTC UNIT
111
104
STORAGE UNIT
103
ROM
102
RAM
101
CPU
109
ENGINE UNIT
108
COMMUNICATION INTERFACE UNIT
107
CAMERA UNIT
106
HUMAN BODY DETECTING SENSOR UNIT
105
OPERATIONAL PANEL

IMAGE PROCESSING APPARATUS, METHOD AND PROGRAM FOR CONTROLLING AN IMAGE PROCESSING APPARATUS BASED ON DETECTED USER MOVEMENT

BACKGROUND OF THE INVENTION

1. Field of the Invention

The present technology relates to an image processing apparatus, a control method of image processing apparatus and a program.

2. Description of the Related Art

A technology has been known, in which proximity of a user is detected with a human sensor in advance, thereby starting recovery operations from a power saving operation mode in order to enable an electronic apparatus, etc., to quickly recover from the power saving state.

For example, a power supply control apparatus is known, which includes a first human sensor, a second human sensor whose detection range is different from that of the first human sensor, wherein human behavior is divided into three patterns based on the detection result of the first human sensor and the second human sensor (for example, see Patent Document 1).

RELATED ART DOCUMENT

Patent Document

[Patent Document 1]: Japanese Laid-open Patent Publication No. 2013-85038

[Patent Document 2]: Japanese Laid-open Patent Publication No. 2006-079272

[Patent Document 3]: Japanese Laid-open Patent Publication No. H11-355779

SUMMARY OF THE INVENTION

An object of disclosure of the present technology is to provide an image processing apparatus which contributes to improving the detection precision of the human's proximity.

The following configuration is adopted to achieve the aforementioned object.

In one aspect of the embodiment, there is provided an image processing apparatus comprising: a capturing part configured to sequentially capture a plurality of images; an extracting part configured to extract movement information from the sequentially captured images through analysis, wherein the movement information relates to movement of a moving object and the sequentially captured images contain images of the moving object; and a first determining part configured to detect an approaching user based on the extracted movement information and approaching movement information, stored in advance, indicating approaching movement of a human.

Other objects, features and advantages of the present invention will become more apparent from the following detailed description when read in conjunction with the accompanying drawings.

DETAILED DESCRIPTION OF THE PREFERRED EMBODIMENTS

In the following, embodiments will be described with reference to accompanied drawings.

<Hardware Configuration>

Figure 1:
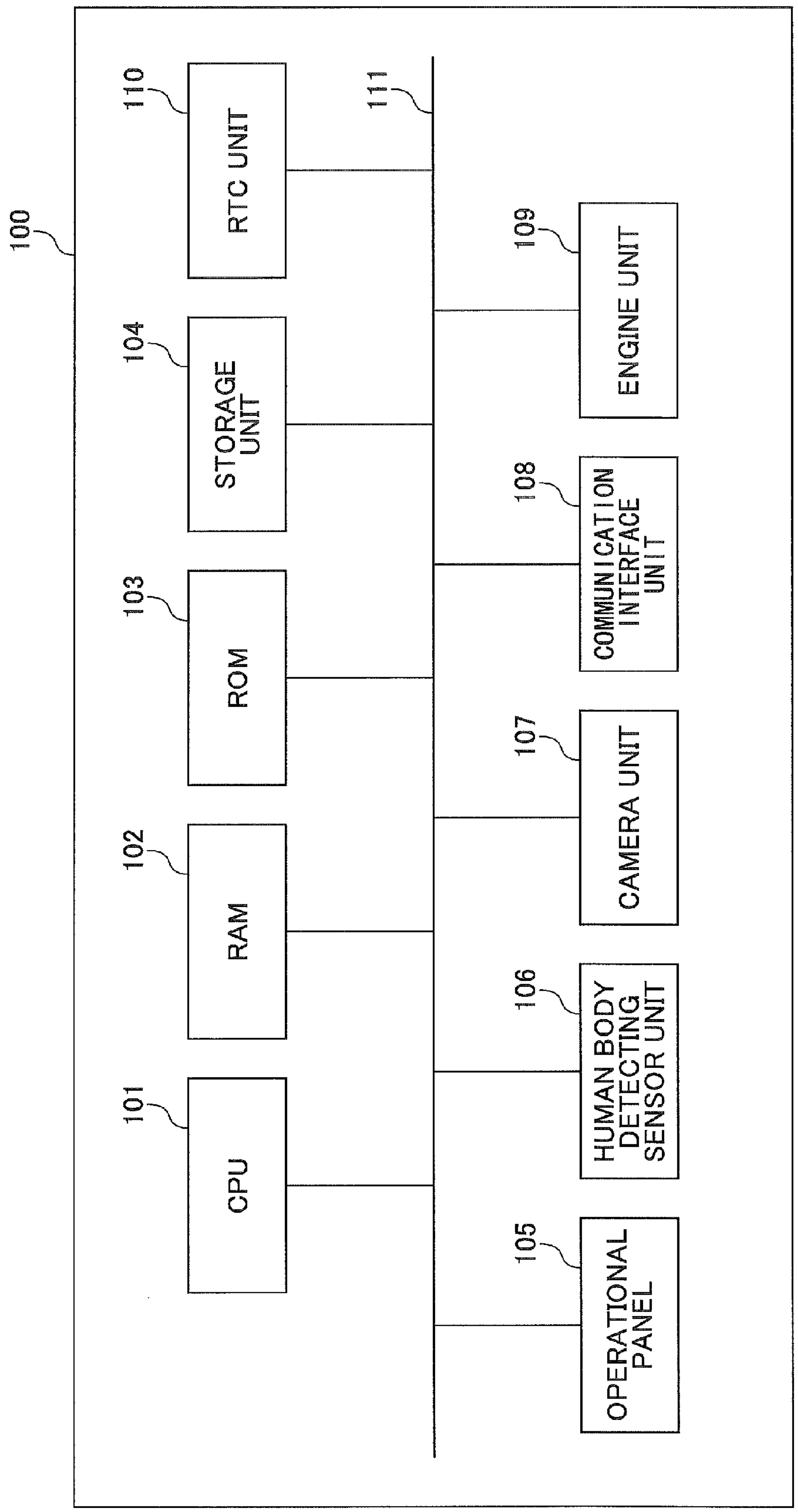
FIG. 1 is a diagram for illustrating a hardware configuration of an image processing apparatus of the present embodiment.

FIG. 1 is a diagram for illustrating a hardware configuration of an image processing apparatus of the present embodiment. For example, the image processing apparatus 100 has a configuration of general purpose computer including a CPU (Central Processing Unit) 101, a RAM (Random Access Memory) 102, a ROM (Read Only Memory) 103, a storage unit 104, an operational panel 105, a human body detecting sensor unit 106, a camera unit 107, a communication interface unit 108, an engine unit 109, a RTC (Real Time Clock) unit 110 and a bus 111.

The CPU 101 is a calculation device for executing processes by retrieving programs and data from the ROM 103, the storage unit 104, etc., to load them into the RAM 102 and to process them, thereby achieving functions of the entire image processing apparatus 100. The RAM 102 is a volatile memory serving as a work area of the CPU 101 and the like. For example, the ROM 103 is a non-volatile memory for storing BIOS (Basic Input/Output System) executed in starting the image processing apparatus 100 or various setting information. For example, the storage unit 104 is a non-volatile storage device for storing an OS (Operating System), application programs data, etc., and is configured with a HDD (Hard Disk Drive), a SSD (Solid State Drive), or the like.

For example, the operational panel 105 includes an input device for accepting input from a user and a display device for displaying processing results of the image processing apparatus 100, and is a display input device such as a touch panel display.

The human body detecting sensor unit 106 is a sensor for detecting a human existing in the vicinity of the image processing apparatus 100 (for example, in a certain range in front side of the operational panel 105 of the image processing apparatus 100). For example, the human body detecting sensor unit 106 is a sensor for detecting a human by using infra-red rays, ultrasonic sound, visible light rays, etc., or a sensor for detecting a human by using image data generated by capturing an image by a camera, or the like. The human body detecting sensor unit 106 is not limited to the aforementioned examples, but may be a sensor for detecting a human with diverse methods. Additionally, a range in which the human can be detected by the human body detecting sensor unit 106 is defined in accordance with types or settings of the human body detecting sensor unit 106. Hereinafter, the range is referred to as "sensor detection range".

For example, the camera unit 107 is a camera capable of sequentially capturing a plurality of images such as moving images in the vicinity of the image processing apparatus 100. Additionally, for example, a plurality of cameras whose locations, directions, and capturing ranges are different from each other may be included in the camera unit 107. The communication interface unit 108 is a communication interface for connecting the image processing apparatus 100 to a network such as the Internet or a LAN (Local Area Network).

The engine unit 109 is hardware for performing respective functions of the image processing apparatus 100. For example, in a case where the image processing apparatus 100 is a multifunction peripheral including a printing function, a copying function, a scanner function, etc., the engine unit 109 includes a printing engine, a scanner engine, and the like. Additionally, the image processing apparatus 100 is not limited to the multifunction peripheral, but it may be an electronic apparatus which determines human proximity based on the images sequentially captured by the camera unit 107, such as a printer, a copy machine, a scanner, a projector, an electronic whiteboard, an entering/leaving management apparatus, or the like.

The RTC unit 110 has a time measuring function, and outputs information related to date, time, period, or the like. The bus 111 is commonly connected to the respective aforementioned units, and for example, transmits an address signal, a data signal, control signals and the like.

According to the aforementioned hardware configuration, the image processing apparatus 100 of the present embodiment performs respective processes described below.

<Software Configuration>

Figure 2:
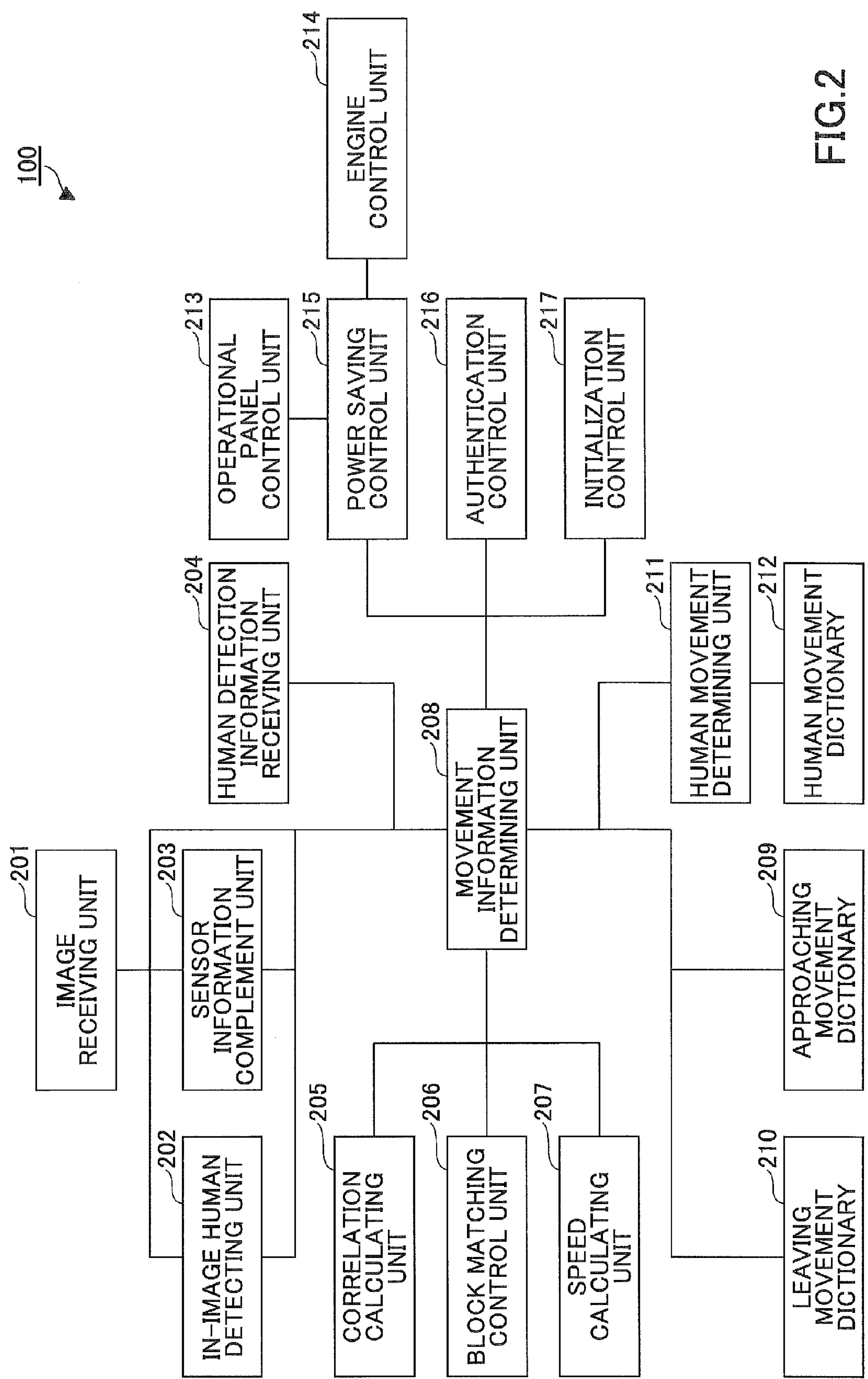
FIG. 2 is a software configuration of the image processing apparatus of the present embodiment.

FIG. 2 is a software configuration of the image processing apparatus of the present embodiment. The image processing apparatus 100 includes an image receiving unit 201, an in-image human detecting unit 202, a sensor information complement unit 203, a human detection information receiving unit 204, a correlation calculating unit 205, a block matching control unit 206, a speed calculating unit 207, a movement information determining unit 208, an approaching movement dictionary 209, a leaving movement dictionary 210, human movement determining unit 211, a human movement dictionary 212, an operational panel control unit 213, an engine control unit 214, a power saving control unit 215, an authentication control unit 216, and an initialization control unit 217 and the like.

The image receiving unit 201 acquires a plurality of images (for example, moving images, or still images arranged in a chronological order) sequentially captured by the camera unit 107 shown in FIG. 1.

The in-image human detecting unit 202 detects a human from the image acquired by the image receiving unit 201, and outputs detected human's coordinate information to the movement information determining unit 208 and the like.

In a case where the camera unit 107 includes a plurality of cameras, the sensor information complement unit 203 complements an area, which could be included in a blind angle if only one camera were used, by combining images received by the image receiving unit 201 from the cameras having been calibrated included in the camera unit 107. Also, the sensor information complement unit 203 outputs multi-viewpoint images captured by the cameras to the movement information determining unit 208 and the like.

The human detection information receiving unit 204 receives detection information of a human body from the human body detecting sensor unit 106 shown in FIG. 1, and outputs position information (coordinate information) of the human body to the movement information determining unit 208 and the like. For example, in a case where the human body detecting sensor unit 106 is a millimeter-wave sensor, the position information of the human body includes detected coordinates in depth direction and in horizontal direction.

The correlation calculating unit 205 outputs vector information indicating correlation amounts between the images received by the image receiving unit 201 as movement information. The vector information indicating correlation amounts between the images can be calculated by using known technology. For example, the correlation calculating unit 205 finds the 25-dimensional correlation amount based on a two-dimensional local area of a binary differential image of the two images, and further calculates 251-dimensional vector information as the movement information by finding the correlation amount from three sequential binary differential images. The 251-dimensional vector is known as a CHLAC (Cubic Higher-order Local Auto-Correlation) characteristic or a CHLAC characteristic vector, or the like (for example, see Patent Document 2).

Additionally, the CHLAC characteristic, a CHLAC characteristic vector, etc., are examples of vector information indicating the correlation amount between the images.

The block matching control unit 206 outputs an optical flow, which is vector information for indicating motions of small areas included in the images received by the image receiving unit 201, as the movement information. For example, the block matching control unit 206 acquires the images received by the image receiving unit 201 through the movement information determining unit 208, etc., thereby outputting the optical flow found with the block matching method as the movement information. The block matching method is a known technology, in which the images are divided into small areas (blocks) to find which small area in the next image corresponds to the small area in the current image, thereby expressing motions of respective small areas with vectors (for example, see Patent Document 3).

Additionally, the optical flow found by the block matching method is an example optical flow for expressing the motion of each small area included in the images. The block matching control unit 206 may calculate the optical flow by using a method other than the block matching method, such as a gradient method.

The speed calculating unit 207 calculates an approaching speed or a moving speed (m/s) of a moving object based on the movement information output from the correlation calculating unit 205 or the block matching control unit 206. Preferably, the speed calculating unit 207 calculates the approaching speed or the moving speed (m/s) of the moving object when the movement of the moving object (such as a human) is determined to be an approaching movement based on the movement information.

The movement information determining unit 208 receives the images received by the image receiving unit 201, and acquires the movement information by using the correlation calculating unit 205 and/or the block matching control unit

206. Also, the movement information determining unit 208 determines whether the movement of the moving object (such as a human) is movement of a user of the image processing apparatus 100 by comparing the acquired movement information with the approaching movement dictionary 209 or the human movement dictionary. Further, for example, the movement information determining unit 208 can determine whether the movement of the moving object is movement of the user of the image processing apparatus 100 leaving (separating) from the image processing apparatus 100 by comparing the acquired movement information with the leaving movement dictionary 210 and the like. For example, the determination result of the movement information determining unit 208 is output to the power saving control unit 215, the authentication control unit 216, the initialization control unit 217, and the like.

For example, the approaching movement dictionary 209 is information indicating the movement of the user approaching the image processing apparatus 100, which has been stored in the storage unit 104, etc., shown in FIG. 1 in advance. For example, the approaching movement dictionary 209 is generated by analyzing the plurality of the movement information items respectively corresponding to the movements of the user approaching the image processing apparatus 100 from a certain distant position. A method for generating the approaching movement dictionary 209 differs depending on the recognition method to be used. For example, in a case where the recognition method uses the subspace method, a main component analysis may be performed on the movement information items, and thereby determining from the first main component to the "N (N is a natural number)" th main component to be information for the approaching movement dictionary 209.

The movement information determining unit 208 can determine whether the movement of the moving object (such as a human) is the approaching movement based on similarity of the images received by the image receiving unit 201 with the approaching movement dictionary 209.

For example, the leaving movement dictionary 210 is information for indicating the movement of the user leaving from the image processing apparatus 100, which has been stored in the storage unit 104 shown in FIG. 1 in advance. For example, the leaving movement dictionary 210 is generated by analyzing the plurality of the movement information items respectively corresponding to the movements of the user departing (separating) from the image processing apparatus 100 to arriving at a certain distant position. A method for generating the leaving movement dictionary 210 may be similar to that for generating the approaching movement dictionary 209.

The movement information determining unit 208 can determine whether the movement of the moving object (such as a human) is the leaving movement based on similarity of the images received by the image receiving unit 201 with the leaving movement dictionary 210.

The human movement determining unit 211 determines whether the movement of the moving object is that of a human based on similarity of the movement information obtained from the images received by the image receiving unit 201 with the human movement dictionary 212.

For example, the human movement dictionary 212 is information for indicating the movement of the human, which has been stored in the storage unit 104 shown in FIG. 1 in advance. Similar to the approaching movement dictionary 209, the human movement dictionary 212 is generated based on the movement information items corresponding to movements of the human around the image processing apparatus 100. For example, the movement of the human includes the approaching movement, the leaving movement, a passing-by movement, and the like.

For example, the operational panel control unit 213 controls power of the operational panel 105 shown in FIG. 1 to turn on/off, backlights to turn on/off, etc., in response to a request from the power saving control unit 215.

For example, the engine control unit 214 controls a power saving operation in the engine unit 109 shown in FIG. 1, the power of engine unit 109 to be turned on/off in response to a request from the power saving control unit 215.

For example, the power saving control unit 215 performs the power saving control of the image processing apparatus 100 based on information indicating elapsed time, button pushing operations, human body detection, the determination result of the movement information determining unit 208, or the like.

For example, the authentication control unit 216 controls the transition between a log-in state and log-out state based on information indicating elapsed time, button pushing operations, human body detection, the determination result of the movement information determining unit 208, or the like.

For example, the initialization control unit 217 determines whether to perform a system reset operation based on information indicating elapsed time, button pushing operations, human body detection, the determination result of the movement information determining unit 208, or the like.

The respective units described above are achieved by programs executed by the CPU 101 shown in FIG. 1 and the like. Also, for example, at least a part of the aforementioned units may be achieved by hardware such as a DSP (Digital Signal Processor) or an integrated circuit.

First Embodiment

Functional Configuration

Figure 3:
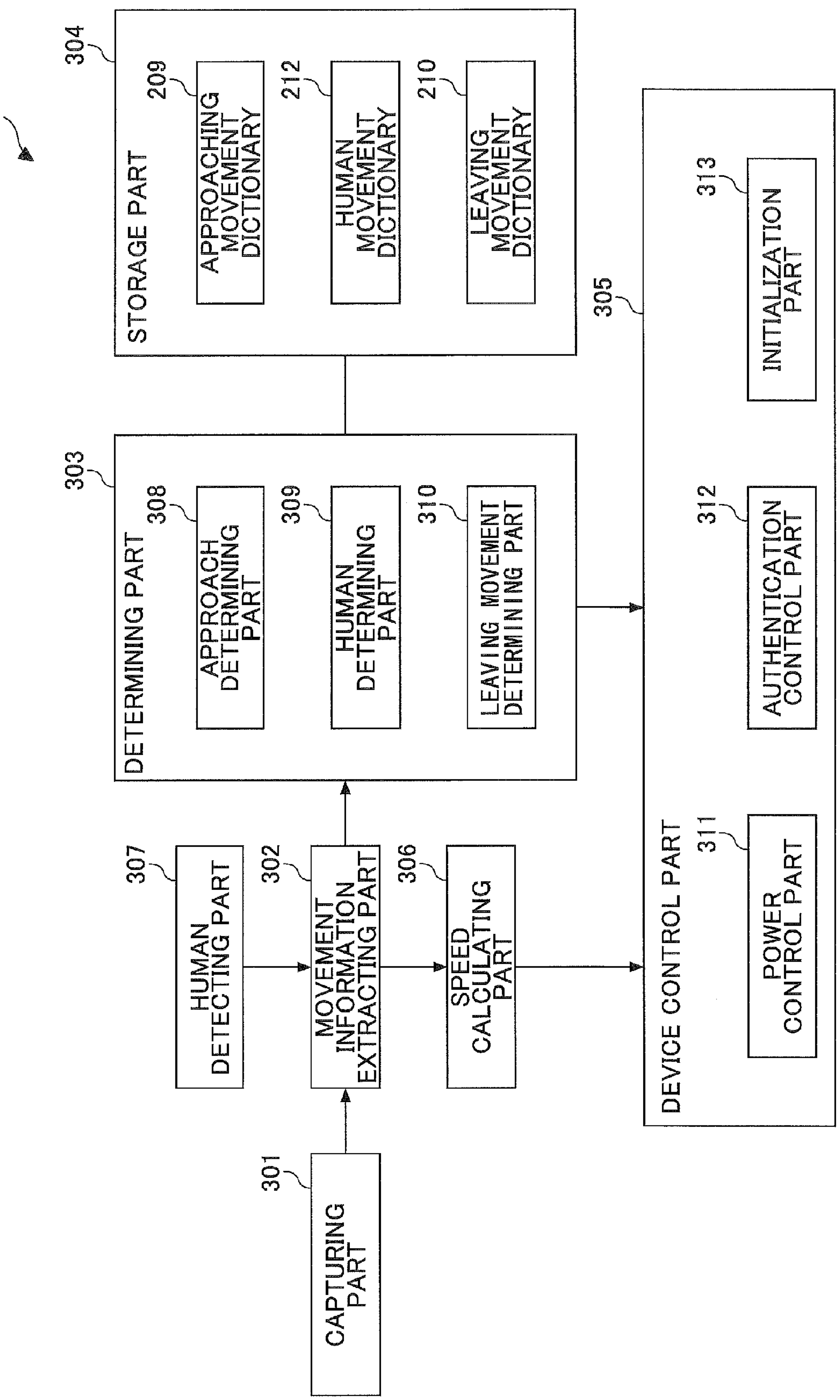
FIG. 3 is a block diagram for illustrating a functional configuration of an image processing apparatus of a first embodiment.

FIG. 3 is a block diagram for illustrating a functional configuration of an image processing apparatus of a first embodiment. The image processing apparatus 100 includes a capturing part 301, a movement information extracting part 302, a determining part 303, a storage part 304, a device control part 305, a speed calculating part 306 and a human detecting part 307.

The capturing part 301, the movement information extracting part 302, the determining part 303, the storage part 304, the device control part 305, the speed calculating part 306 and the human detecting part 307, etc., may be achieved by programs executed in the image processing apparatus 100.

The capturing part 301 sequentially captures images around the image processing apparatus 100 (for example, in front of the operational panel 105, or the like) to obtain a plurality of images such as moving images or still images arranged in a chronological sequence. For example, the capturing part 301 is achieved by the camera unit 107 shown in FIG. 1, the image receiving unit 201 shown in FIG. 2, or the like.

The movement information extracting part 302 extracts the movement information related to a moving object included in the images sequentially captured by the capturing part 301. For example, the movement information extracted by the movement information extracting part 302 includes the vector information (such as an optical flow), which is calculated by the block matching control unit 206 shown in FIG. 2, for indicating motions of the small areas included in the images.

Or, for example, the movement information extracted by the movement information extracting part 302 includes the vector information (such as a CHLAC characteristic amount), which is calculated by the correlation calculating unit 205 shown in FIG. 2. Also, the movement information extracting part 302 may extracts both of the movement information items respectively calculated by the block matching control unit 206 and the correlation calculating unit 205. For example, the movement information extracting part 302 is achieved by the block matching control unit 206 and the correlation calculating unit 205 shown in FIG. 2, and the like.

The determining part 303 determines the movement of the object (such as a human) included in the images sequentially captured by the capturing part 301 based on the movement information extracted by the movement information extracting part 302 and information stored in the storage part 304. For example, the determining part 303 includes an approach determining part 308, a human determining part 309, a leaving movement determining part 310, and the like.

The approach determining part (first determining unit) 308 determines user's approach to the image processing apparatus 100 based on the movement information extracted by the movement information extracting part 302 and the approaching movement dictionary (approaching movement information) 209 stored in the storage part 304 in advance. For example, the determining part 308 determines whether the approaching movement of the user is included in the movement information extracted by the movement information extracting part 302.

The human determining part (second determining unit) 309 determines whether the extracted movement information indicates a movement of a human based on the movement information extracted by the movement information extracting part 302 and the human movement dictionary (human movement information) 212 stored in the storage part 304 in advance.

The leaving movement determining part (third determining unit) 310 determines leaving movement of the user separating from the image processing apparatus 100 based on the movement information extracted by the movement information extracting part 302 and the leaving movement dictionary (leaving movement information) 210 stored in the storage part 304 in advance. For example, the leaving movement determining part 310 determines whether the leaving movement of the user separating from the image processing apparatus 100 is included in the movement information extracted by the movement information extracting part 302.

For example, the determining part 303 is achieved by the movement information determining unit 208 and the human movement determining unit 211 shown in FIG. 2, and the like.

The storage part 304 is a storage part for storing the approaching movement dictionary 209, the human movement dictionary 212, leaving movement dictionary 210, etc., and achieved by, for example, the storage unit 104 and the RAM 102 shown in FIG. 1, and the like.

The device control part 305 performs respective controls of the image processing apparatus 100 based on the determination results of the determining part 303. For example, the device control part 305 includes a power control part 311, an authentication control part 312, an initialization part 313, and the like.

The power control part 311 controls transition of respective power supply states of the image processing apparatus 100 such as "normal", "standby" or "sleep", and the like, in response to notifications from the determining part 303 such as the determination result of the movement information. For example, the power control part 311 is achieved by the power saving control unit 215, the operational panel control unit 213 and the engine control unit 214 shown in FIG. 2, and the like.

The authentication control part 312 controls authentications performed in the image processing apparatus 100 such as user's log-in/logout to/from the image processing apparatus 100 in response to notifications from the determining part 303 such as the determination results of the movement information. For example, the authentication control part 312 is achieved by the authentication control unit 216 shown in FIG. 2, and the like.

The initialization part 313 controls, based on the notification indicating determination result of the determining part 303 regarding the movement information, initialization of the image processing apparatus 100 such as system reset operation or setting reset operation of the image processing apparatus 100. For example, the initialization part 313 is achieved by the initialization unit 217 shown in FIG. 2 and the like.

For example, the speed calculating part 306 calculates moving speed of the human whose approach is determined by the approach determining part 308, and the like. For example, the speed calculating part 306 is achieved by the speed calculating unit 207 shown in FIG. 2 and the like.

For example, the human detecting part 307 is achieved by the human body detecting sensor unit 106 shown in FIG. 1, the human detection information receiving unit 204 shown in FIG. 2, etc., and it acquires (detects) one or more humans' coordinate information within a certain range of area (such as a sensor detection range of the human body detecting sensor unit 106).

According to the aforementioned configuration, for example, the image processing apparatus 100 can cancel the power saving state of the image processing apparatus 100 so that the image processing apparatus 100 can be immediately used by the user in a case where the approaching movement of the user included in the images captured by the capturing part 301.

<Process Flow>

<Example Basic Process>

Figure 4:
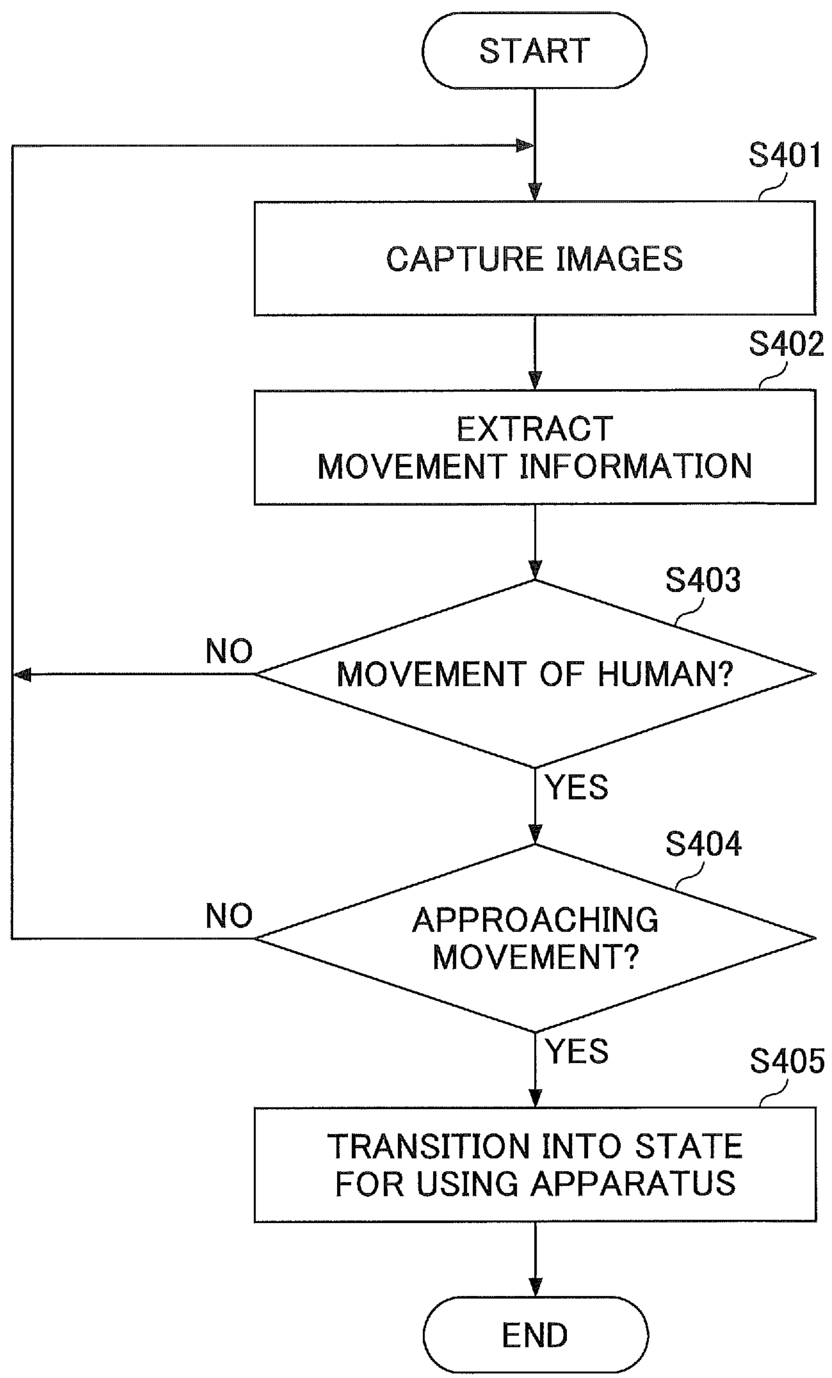
FIG. 4 is a flowchart for illustrating an example basic process flow of the first embodiment.

FIG. 4 is a flowchart for illustrating basic process flow of the first embodiment. In FIG. 4, the image processing apparatus 100 is in the power saving state, and the user cannot use the image processing apparatus 100 until the power saving state is canceled.

In step S401, the capturing part 301 of the image processing apparatus 100 sequentially captures the images. Here, the images captured by the capturing part 301 may be moving images or still images captured with a certain interval.

In step S402, the movement information extracting part 302 of the image processing apparatus 100 extracts the movement information based on the images sequentially captured by the capturing part 301. For example, the movement information extracted by the movement information extracting part 302 includes the vector information (such as an optical flow) indicating motion of every small areas included in the images sequentially captured by the capturing part 301. Or, the movement information extracted by the movement information extracting part 302 includes the vector information (such as a CHLAC characteristic amount) indicating the correlation amounts between the images sequentially captured by the capturing part 301.

Preferably, in step S403, the human determining part 309 determines whether the movement information extracted by the movement information extracting part 302 indicates movement of a human. For example, the human determining part 309 calculates a similarity of the movement information extracted by the movement information extracting part 302 with the movement information of the human movement dictionary 212, and it determines the extracted movement information to indicate the movement of the human upon detecting that the calculated similarity reaches a predetermined threshold value. For example, according to the aforementioned process, an error operation caused by a moving object other than the human, such as a vehicle, luggage, animals, and industrial products can be prevented. Additionally, the image processing apparatus 100 may optionally not perform the process of step S403.

In a case where the extracted movement information is determined not to indicate the movement of the human in step S403, the process of the image processing apparatus 100 returns to step S401 to repeatedly perform the aforementioned processes. Meanwhile, in a case where the extracted movement information is determined to be indicating the movement of the human in step S403, the process proceeds to step S404.

In step S404, the approach determining part 308 of the image processing apparatus 100 determines whether the approaching movement is included in the movement information extracted by the movement information extracting part 302. For example, the approach determining part 308 calculates a similarity of the movement information extracted by the movement information extracting part 302 with the movement information of the approaching movement dictionary 209, and it determines the extracted movement information to be indicating the approaching movement of the user upon detecting that the calculated similarity reaches a predetermined threshold value.

In a case where the extracted movement information is determined not to include the approaching movement in step S404, the process of the image processing apparatus 100 returns to step S401 to repeatedly perform the aforementioned processes. Meanwhile, in a case where the extracted movement information is determined to include the approaching movement in step S404, the approach determining part 308 sends information indicating the user's approach to the device control part 305, and the process proceeds to step S405.

In step S405, the power control part 311 of the image processing apparatus 100 awakens the image processing apparatus 100 from the power saving state to transition into a state (such as "standby") where the user can use the image processing apparatus 100.

Additionally, in step S405, the control to awaken the image processing apparatus 100 from the power saving state performed by the power control part 311 is an example control performed by the device control part 305 having received information indicating the user's approach. For example, the device control part 305 may display a password input screen with the authentication control part 312 in response to receiving the information indicating the user's approach. Or, the device control part 305 may initialize the setting information with the initialization part 313 preparing for another user's operation in response to receiving the information indicating the user's approach.

According to the aforementioned process, the image processing apparatus 100 of the present embodiment detects the user's proximity by using the movement information extracted from the images sequentially captured by the capturing part 301 and the movement dictionary stored in advance. Thus, the image processing apparatus 100 can improve a precision of the user's proximity detection while reducing influence of contour information created by attire of the human, shoes, belongings, or the like.

<Example Process when a Plurality of Humans are Detected>

Figure 5:
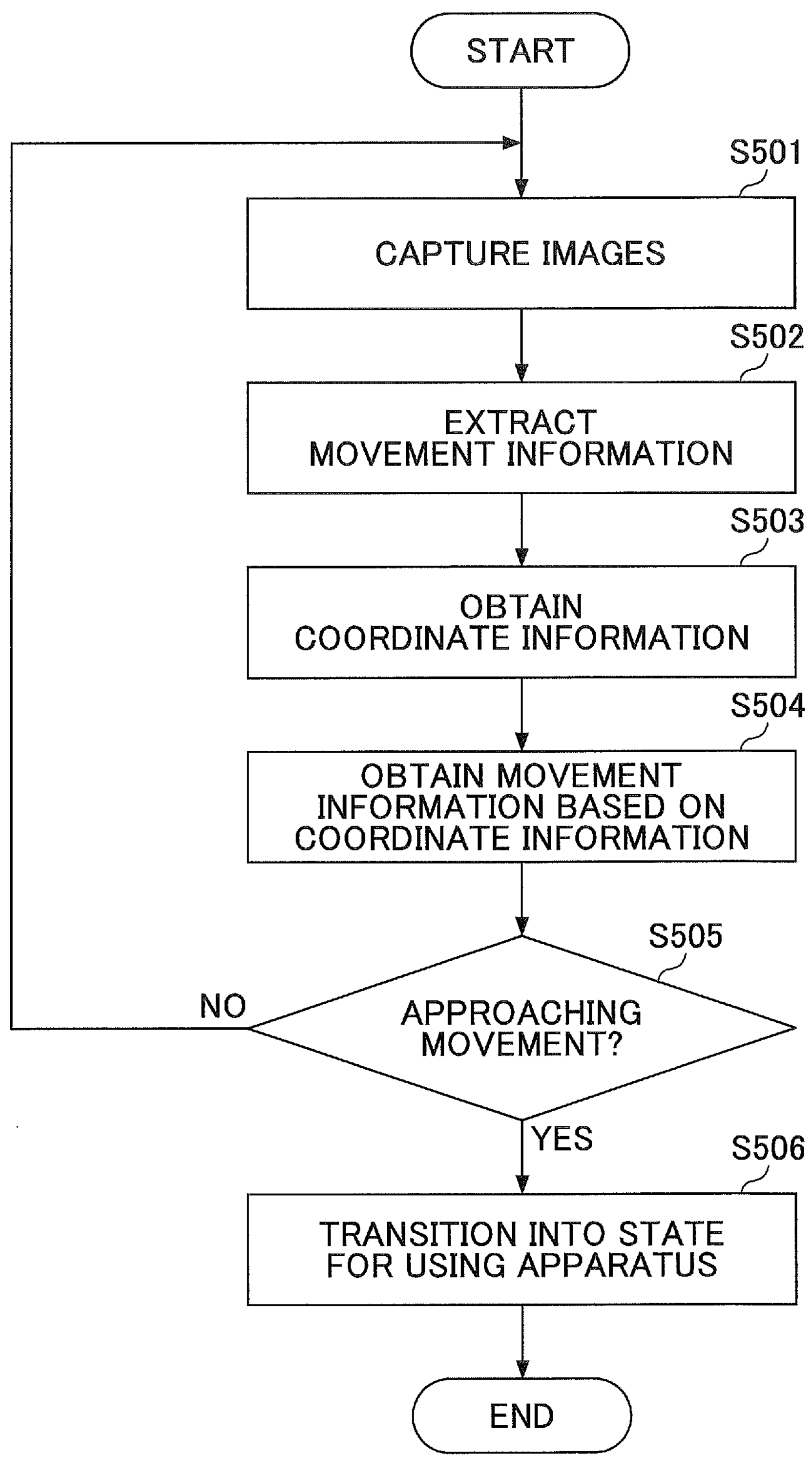
FIG. 5 is a flowchart for illustrating an example process of the present embodiment in a case where a plurality of humans are detected.

FIG. 5 is a flowchart for illustrating an example process of the first embodiment in a case where a plurality of humans are detected.

In step S501, the capturing part 301 of the image processing apparatus 100 sequentially captures the images. This process may be the same as that of step S401 shown in FIG. 4.

In step S502, the movement information extracting part 302 of the image processing apparatus 100 extracts the movement information based on the images sequentially captured by the capturing part 301. This process may be the same as that of step S402 shown in FIG. 4.

In step S503, the human detecting part 307 of the image processing apparatus 100 acquires (detects) human's coordinate information within a certain range of area (such as a sensor detection range of the human body detecting sensor unit 106). For example, in a case where the human body detecting sensor unit 106 is a pyroelectric sensor, coordinate information for indicating a position of a heat source around it can be obtained. Also, for example, in a case where the human body detecting sensor unit 106 is a millimeter-wave sensor, coordinate information may indicate a position of an object whose position varies from a position recorded in the ambient object information that has been generated in advance, when the image processing apparatus 100 has been disposed or the like.

In step S504, the movement information extracting part 302 of the image processing apparatus 100 extracts the movement information on a moving object-by-moving object basis based on the coordinate information obtained by the human detecting part 307. Thus, the movement information extracting part 302 can easily extract the respective movement information items of two or more moving objects in a case where the two or more moving objects are detected by the human detecting part 307.

In step S505, the approach determining part 308 of the image processing apparatus 100 determines whether the respective movement information items extracted by the movement information extracting part 302 indicate the approaching movement. In a case where any of the extracted movement information items is determined to indicate the approaching movement in step S505, for example, the approach determining part 308 sends information for indicating the user's approach to the device control part 305, and the process proceeds to step S506. Meanwhile, in case where none of the extracted movement information items indicates the approaching movement, the process of the image processing apparatus 100 returns to step S501 to repeatedly perform the aforementioned processes.

In step S506, the power control part 311 of the image processing apparatus 100 awakens the image processing apparatus 100 from the power saving state to transition to a state (such as "standby") where the user can use the image processing apparatus 100. Additionally, the control to awaken the image processing apparatus 100 from the power saving state performed by the power control part 311 is an example control performed by the device control part 305 having received information indicating the user's approach.

Figure 6:
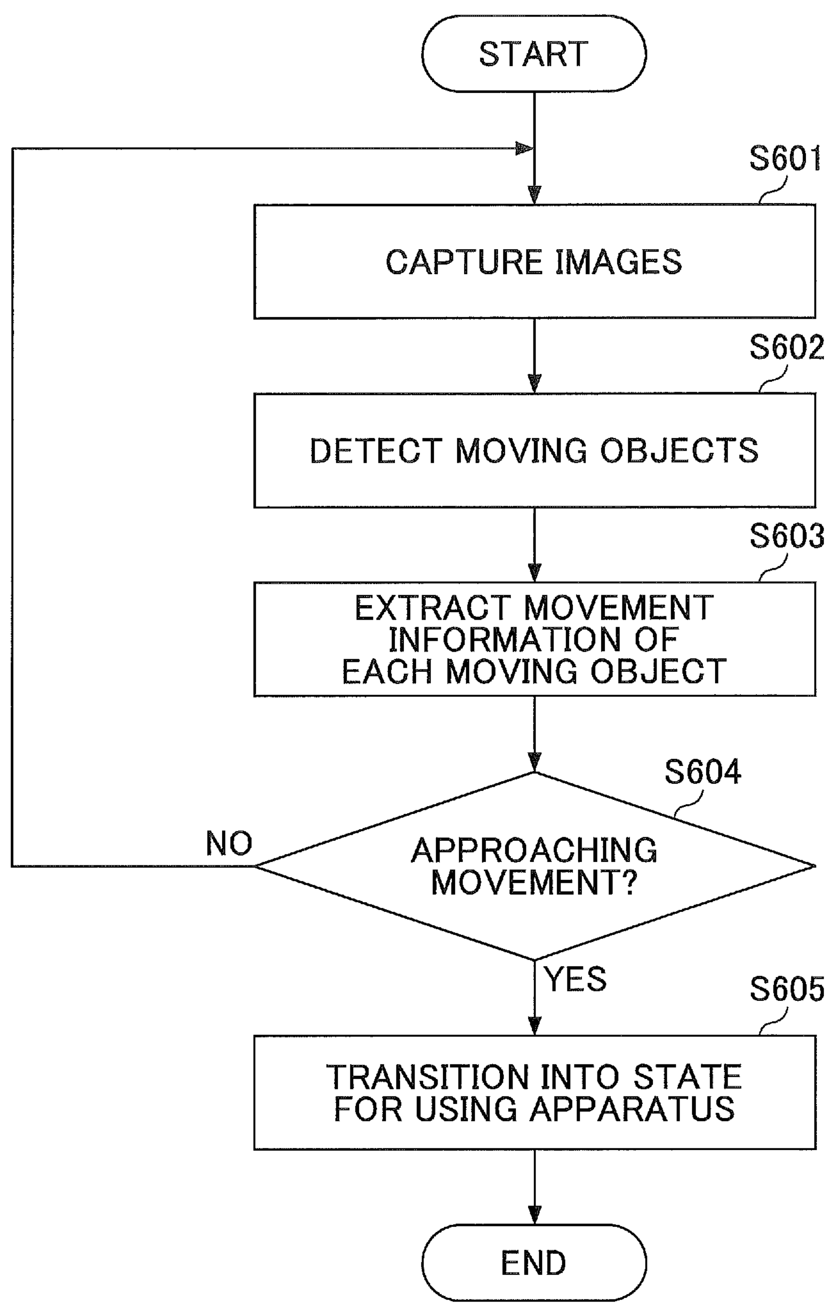
FIG. 6 is a flowchart for illustrating another example process of the present embodiment in a case where a plurality of humans are detected.

Thus, by obtaining the respective coordinate information items of the one or more moving objects with the human detecting part 307, a process for dividing an area of the captured image on a moving object-by-moving object basis with the movement information extracting part 302, which will be described with reference to FIG. 6, is not required, thereby quickly performing the process for extracting the movement information.

FIG. 6 is a flowchart for illustrating another example process of the first embodiment in a case where a plurality of humans are detected. In FIG. 6, the image processing apparatus 100 does not include the human detecting part 307.

In step S601, the capturing part 301 of the image processing apparatus 100 sequentially captures the images. This process may be the same as that of step S501 shown in FIG. 5.

In step S602, the movement information extracting part 302 of the image processing apparatus 100 detects the moving objects (such as humans) included in the images captured by the capturing part 301 to obtain the position information (coordinates) of the moving objects.

In step S603, the movement information extracting part 302 of the image processing apparatus 100 divides the image captured by the capturing part 301 into areas on a moving object-by moving object basis. Also, the movement information extracting part 302 extracts the movement information items from the respective divided areas.

In step S604, the approach determining part 308 of the image processing apparatus 100 determines whether the respective movement information items extracted by the movement information extracting part 302 indicate the approaching movement. In a case where any of the extracted movement information items is determined to indicate the approaching movement in step S604, for example, the approach determining part 308 sends information for indicating the user's approach to the device control part 305, and the process proceeds to step S605. Meanwhile, in case where none of the extracted movement information items indicates the approaching movement, the process of the image processing apparatus 100 returns to step S601 to repeatedly perform the aforementioned processes.

In step S605, the power control part 311 of the image processing apparatus 100 awakens the image processing apparatus 100 from the power saving state to transition to a state where the user can use the image processing apparatus 100.

According to the process described above, approaching movement of the plurality of humans can be determined even by the image processing apparatus 100 without the human detecting part 307.

<Example Process Using Moving Speed>

Figure 7:
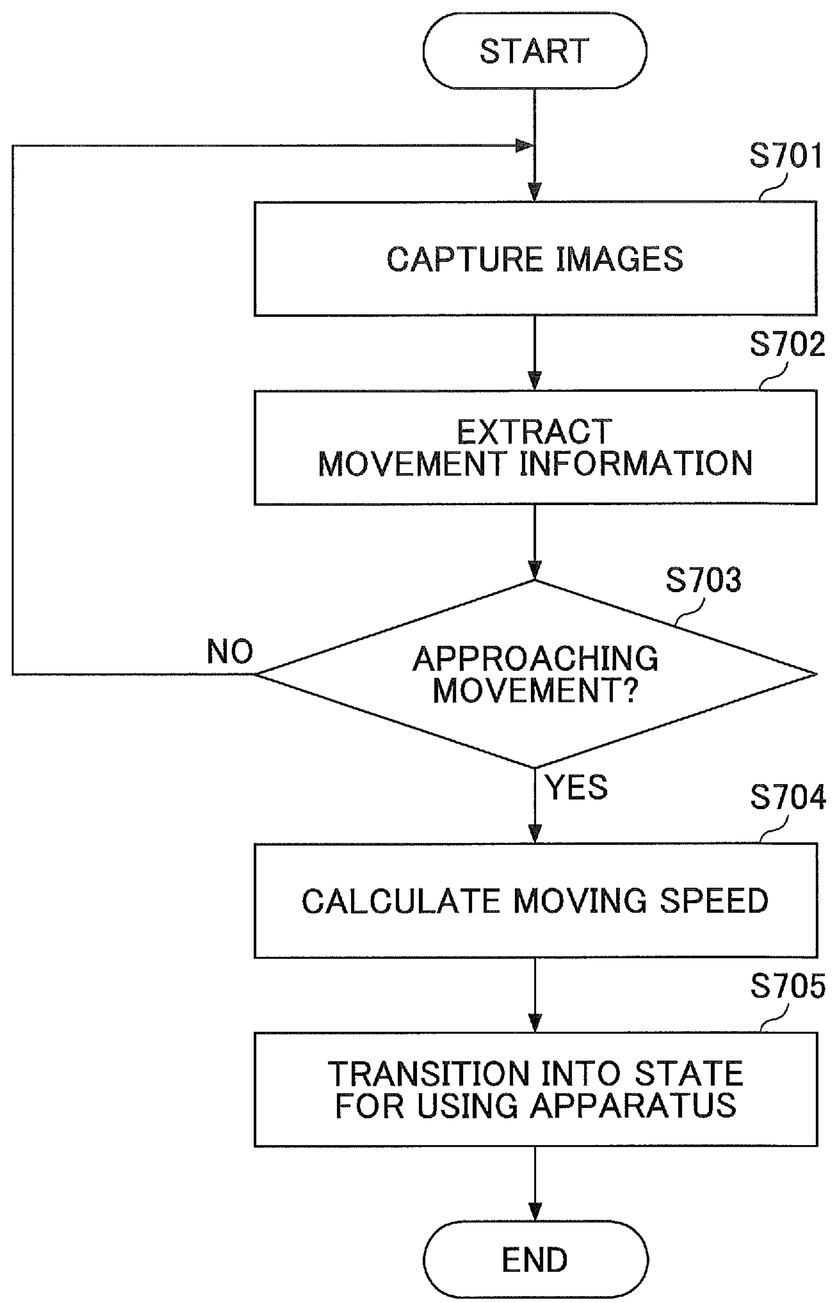
FIG. 7 is a flowchart for illustrating an example process of the first embodiment using a moving speed.

FIG. 7 is a flowchart for illustrating an example process of the first embodiment using the moving speed.

In step S701, the capturing part 301 of the image processing apparatus 100 sequentially captures a plurality of images.

In step S702, the movement information extracting part 302 of the image processing apparatus 100 extracts the movement information based on the images sequentially captured by the capturing part 301.

In step S703, the approach determining part 308 of the image processing apparatus 100 determines whether the approaching movement is included in the movement information extracted by the movement information extracting part 302. In a case where the extracted movement information is determined not to include the approaching movement in step S703, the process of the image processing apparatus 100 returns to step S701 to repeatedly perform the aforementioned processes. Meanwhile, in a case where the extracted movement information is determined to include the approaching movement in step S703, for example, the approach determining part 308 sends information indicating the user's approach to the device control part 305, and the process proceeds to step S704.

In step S704, the speed calculating part 306 of the image processing apparatus 100 calculates the moving speed (such as an approaching speed) of the user based on the movement information extracted by the movement information extracting part 302, and thereby reports it to the device control part 305.

In step S705, the device control part 305 controls the image processing apparatus 100 based on the information for indicating the user's approach sent from the approaching determining part 308 and the moving speed of the user reported from the speed calculating part 306. Thus, for example, the power control part 311 cancels the power saving state of the image processing apparatus 100 to transition into a state where the image processing apparatus 100 can be used in accordance with the moving speed of the user. The reason is that if the power saving state is immediately canceled in a case where the user approaches slowly, electric power may be consumed in vain before the user starts the operation. Therefore, the power saving state is canceled in accordance with timing at which the user starts to use the image processing apparatus 100.

<Example Process when User is Leaving>

Figure 8:
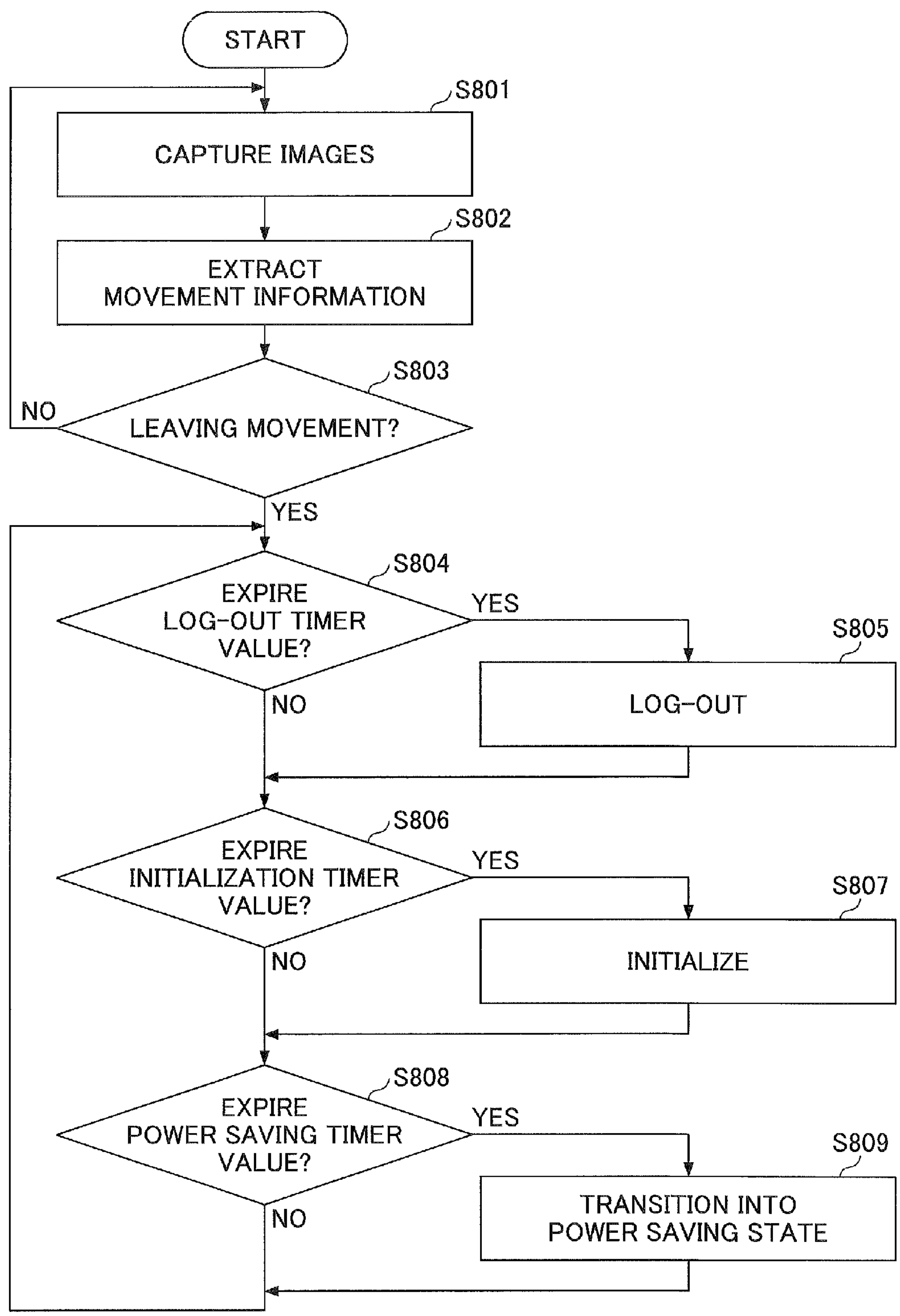
FIG. 8 is a diagram for illustrating an example process in a case where a user is leaving (separating).

FIG. 8 is a diagram for illustrating an example process of the first embodiment in a case where the user is leaving (separating). In FIG. 8, the image processing apparatus 100 is used by the user when the process is started.

In step S801, the capturing part 301 of the image processing apparatus 100 sequentially captures the images.

In step S802, the movement information extracting part 302 of the image processing apparatus 100 extracts the movement information based on the images sequentially captured by the capturing part 301.

In step S803, the leaving movement determining part 310 of the image processing apparatus 100 determines whether the leaving movement of the user separating from the image processing apparatus 100 is included in the movement information extracted by the movement information extracting part 302. For example, the leaving movement determining part 310 calculates a similarity of the extracted movement information with the movement information of the leaving movement dictionary 210, and it determines the extracted movement information to be indicating the leaving movement of the user separating form the image processing apparatus 100 upon detecting that the calculated similarity reaches a predetermined threshold value.

In a case where the extracted movement information is determined not to include the leaving movement in step S803, the process of the image processing apparatus 100 returns to step S801 to repeatedly perform the aforementioned processes. Meanwhile, in a case where the extracted movement information is determined to include the leaving movement in step S803, for example, the leaving movement determining part 310 sends information indicating the user's separation to the device control part 305.

In step S804, in a case where a log-out timer value is determined to have expired, the authentication control part 312 performs a log-out operation of the user who has used the image processing apparatus 100 (step S805).

In step S806, in a case where an initialization timer value is determined to have expired, the initialization part 313 performs an initialization operation of the image processing apparatus 100, such as the system reset operation or the setting rest operation (step S807).

In step S808, in a case where a power saving timer value is determined to have expired, the power control part 311 has the state of the image processing apparatus 100 transition into the power saving state (step S809).

Thus, the image processing apparatus 100 can detect the user separating from it to perform the log-out operation, the initialization operation, the power saving state transition operation, and the like.

<Another Example of Basic Process>

Figure 9:
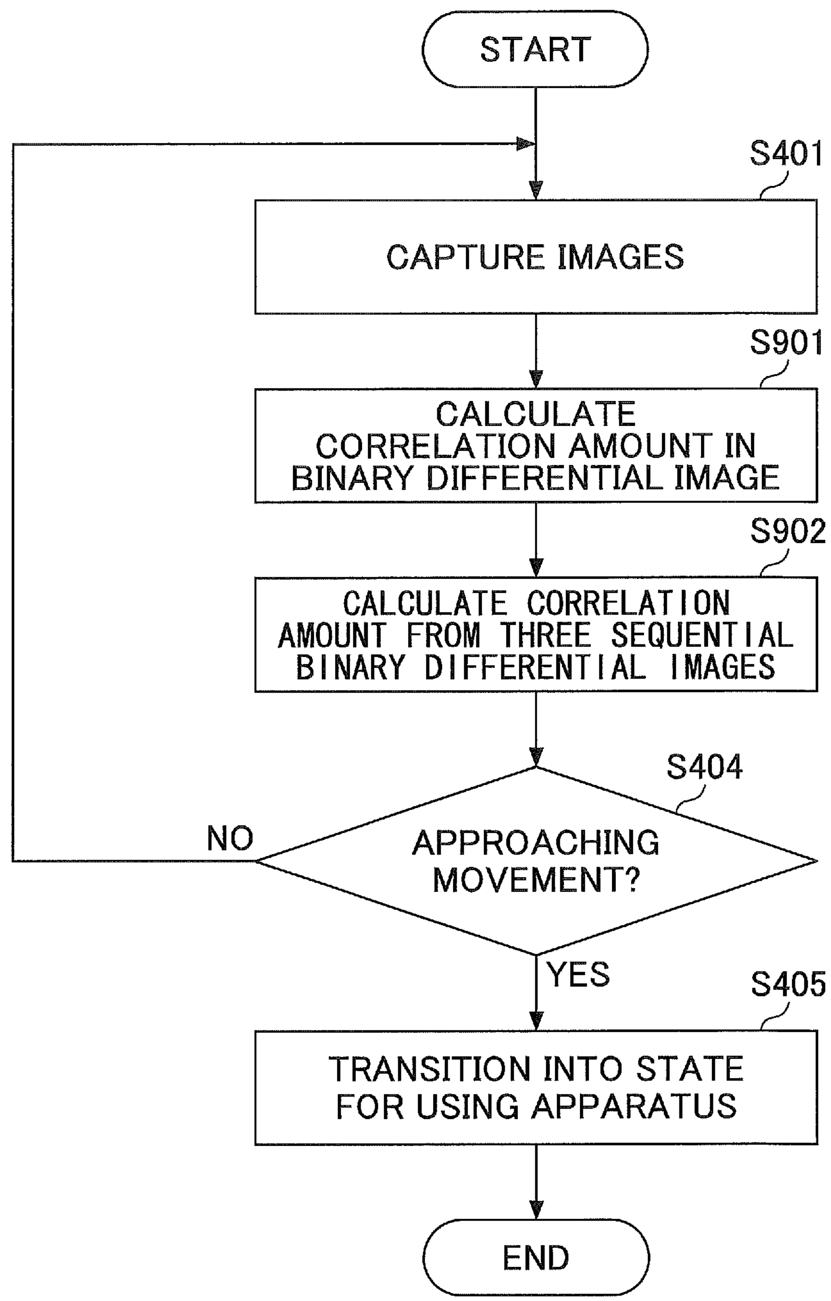
FIG. 9 is a flowchart for illustrating another example of the basic process of the first embodiment.

FIG. 9 is a flowchart for illustrating another example of the basic process of the first embodiment. The process shown in FIG. 9 is an example where the correlation amount between the images is used as the movement information in step S402 shown in FIG. 4. Also, in FIG. 9, the process performed in step S403 shown in FIG. 4, in which whether the movement is human's movement is determined, is omitted. The processes of step S401, S404 and S405 are similar to those shown in FIG. 4, and here, differences from the process shown in FIG. 4 are mainly described.

When using the correlation amount between the images calculated by the correlation calculating unit 205 shown in FIG. 2 as the movement information, the movement information extracting part 302 finds the 25-dimensional correlation amount based on two-dimensional local areas of a binary differential image of the two images (step S901). Further the movement information extracting part 302 calculates the 251-dimensional correlation amounts (vector information) from three sequential binary differential images (step S902) to output the 251-dimensional vector information as the movement information. The movement information created by the correlation amounts has an advantage in that the movement information is unlikely to be affected by contours of attire of the user, shoes, belongings, etc., in comparison to the movement information created by the optical flow.

Also, as shown in FIG. 9, the process performed in step S403 shown in FIG. 4, in which whether the movement is human's movement is determined, can be omitted.

Additionally, the image processing apparatus 100 of the present embodiment may perform a process by combining the processes shown in FIG. 4-FIG. 9.

Second Embodiment

In the present embodiment, descriptions are given in a case where the image processing apparatus 100 includes a plurality of the capturing parts.

<Functional Configuration>

Figure 10:
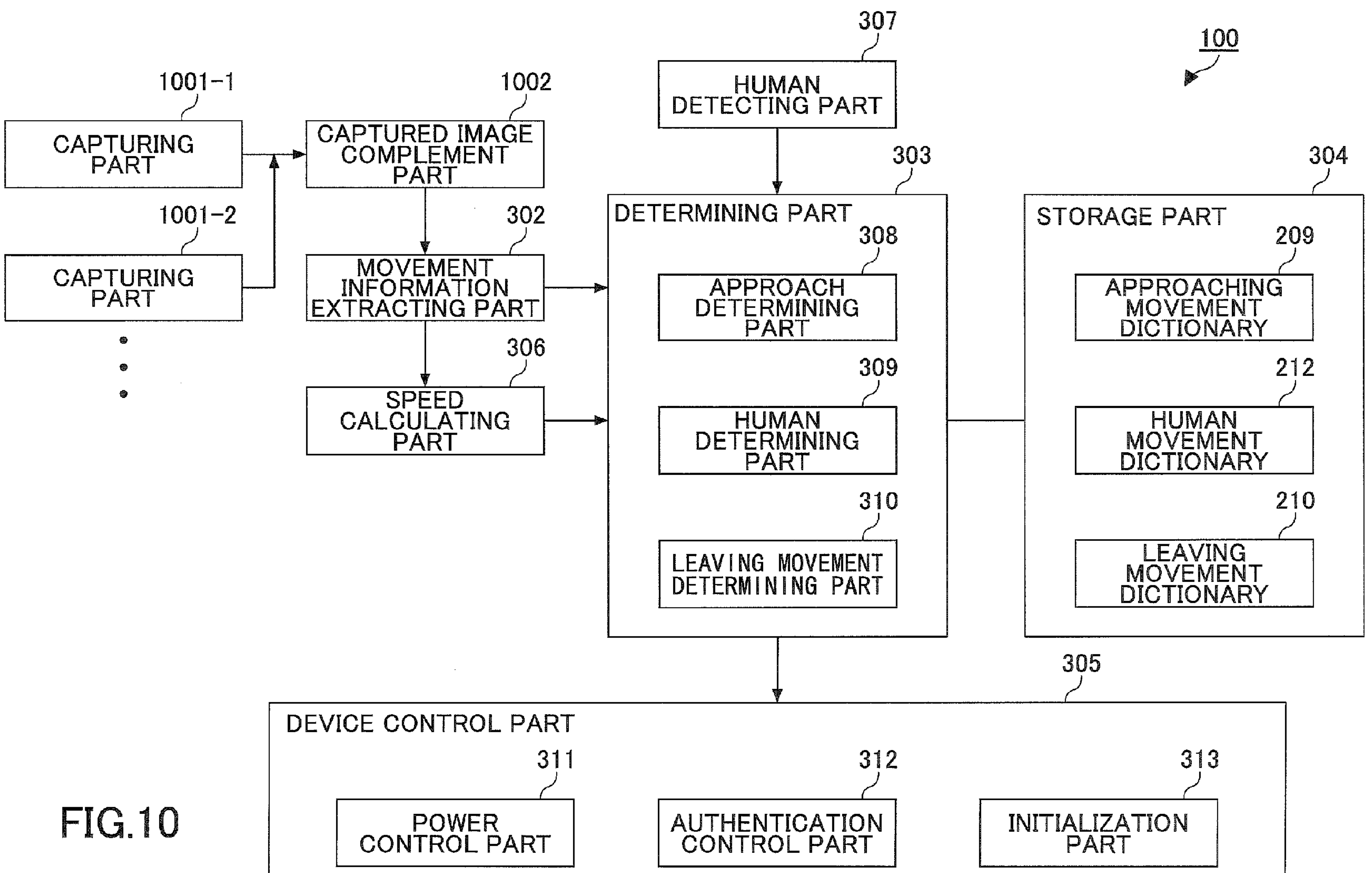
FIG. 10 is a block diagram for illustrating a functional configuration of the image processing apparatus of a second embodiment.

FIG. 10 is a block diagram for illustrating a functional configuration of the image processing apparatus of the second embodiment. The image processing apparatus 100 of the present embodiment includes a plurality of capturing parts 1001-1, 1001-2, etc., and a captured image complement part 1002. Additionally, the functional configuration of the present embodiment may be similar to that of the first embodiment except those mentioned above. Also, in the example shown in FIG. 10, although only two capturing parts are shown, three or more capturing parts may be included.

For example, the respective capturing parts 1001-1 and 1001-2 sequentially capture images around the image processing apparatus 100 (for example, in front of the operational panel 105, or the like) to obtain a plurality of images such as moving images or still images arranged in a chronological sequence.

For example, the captured image complement part 1002 is achieved by the sensor information complement unit 203 shown in FIG. 2, etc., and it complements an area, which could be included in a blind angle if only one capturing part was included, by combining images captured by the capturing parts 1001-1 and 1001-2. Thus, in the present embodiment, the movement information can be obtained even in an area, which could be included in a blind angle if only one capturing part is used.

Also, in the present embodiment, the movement information extracting part 302 may extract the movement information from the multi-viewpoint images captured by the capturing parts 1001-1 and 1001-2. By extracting the movement information from the multi-viewpoint images, precision to determine the user's movement is expected to be improved.

<Process Flow>

Figure 11:
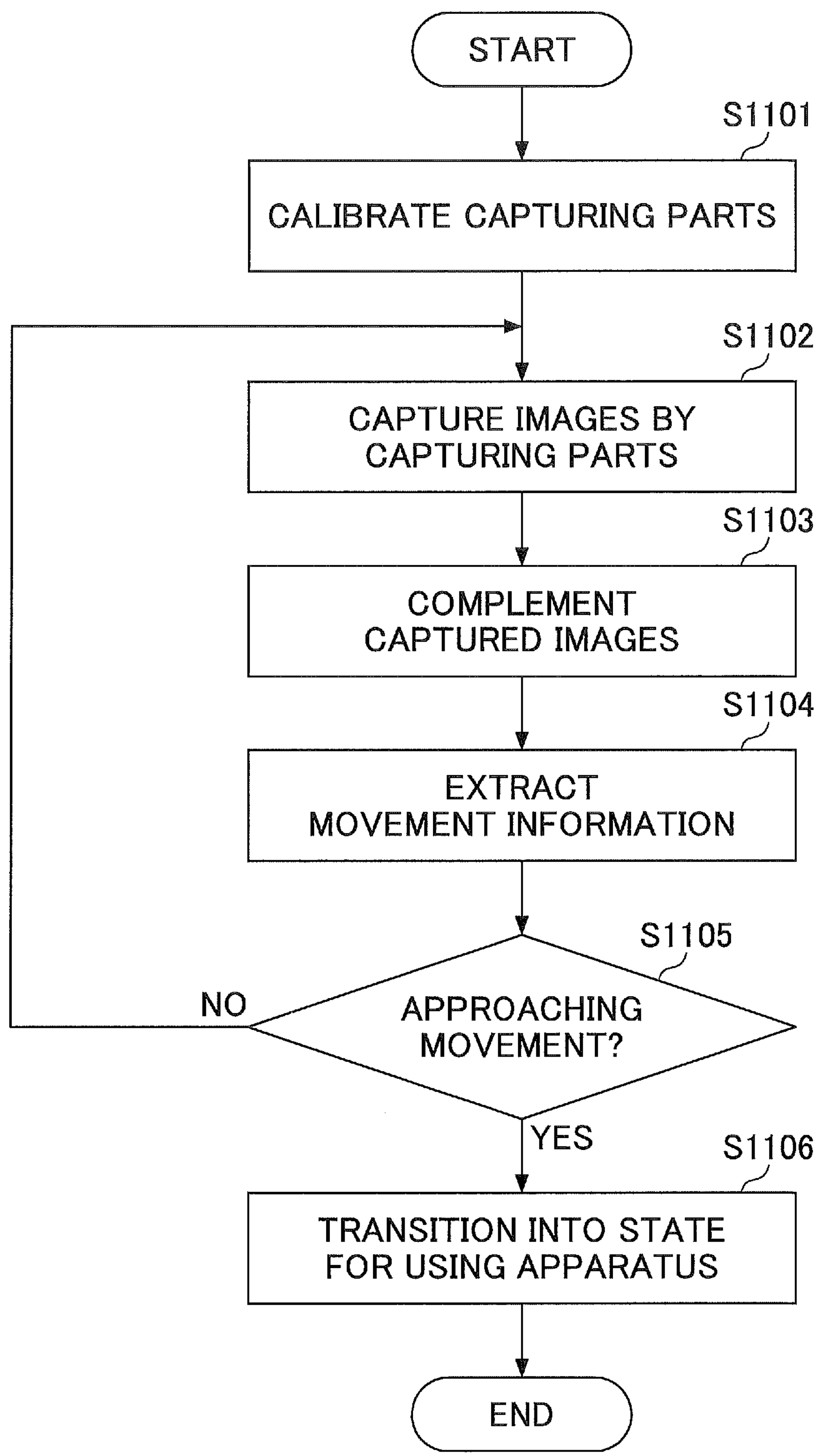
FIG. 11 is a flowchart for illustrating a basic process of the second embodiment.

FIG. 11 is a flowchart for illustrating a basic process of the second embodiment.

In step S1101, the captured image complement part 1002 performs calibration operations on the capturing parts 1001-1 and 1001-2. For example, the captured image complement part 1002 has the respective capturing parts 1001-1 and 1001-2 capture the same object, and thereby adjusts respective parameters so that respective coordinate systems in the capturing parts 1001-1 and 1001-2 become coincident. Additionally, in a case where change of position, etc., is not required in response to performing the calibration operations on the capturing parts 1001-1 and 1001-2, the process of step S1101 may be omitted.

In step S1102, the captured image complement part 1002 acquires the captured images from the respective capturing parts 1001-1 and 1001-2.

In step S1103, the captured image complement part 1002 complements the captured images acquired form the capturing parts 1001-1 and 1001-2. For example, in a case where an area is included in the blind angle when capturing images by only capturing part 1001-1, the captured image complement part 1002 complements the area included in the blind angle by using the images acquired from the capturing part 1001-2. Also, in a case where an area is included in the blind angle when capturing images by only capturing part 1001-2, the captured image complement part 1002 complements the area included in the blind angle by using the images acquired from the capturing part 1001-1.

In step S1104, the approach determining part 308 extracts the movement information form the images complemented by the captured image complement part 1002. The movement information may be extracted from a single-viewpoint image whose blind angle has been complemented or from the multi-viewpoint image.

In step S1105, the approach determining part 308 of the image processing apparatus 100 determines whether the approaching movement is included in the movement information extracted by the movement information extracting part 302. In a case where it is determined that the approaching movement is not included in the extracted movement information in step S1105, the process of the image processing apparatus 100 returns to step S1101 to repeatedly perform the aforementioned processes. Meanwhile, in a case where it is determined that the approaching movement is included in the extracted movement information in step S1105, for example, the approach determining part 308 sends information for indicating the user's approach to the device control part 305, and the process proceeds to step S1106.

In step S1106, the power control part 311 of the image processing apparatus 100 awakens the image processing apparatus 100 from the power saving state to transition to a state where the user can use the image processing apparatus 100.

Thus, by using the plurality of capturing parts, the precision of the movement information extracted in the image processing apparatus 100 can be improved.

<Summary>

The image processing apparatus 100 of the present embodiment includes a capturing part (301) for sequentially capturing a plurality of images and an extracting part (302) for extracting movement information relates to movement of a moving object included in the sequentially captured images. Also, the image processing apparatus 100 includes a first determining part (308) for determining user's approach based on the extracted movement information and approaching movement information indicating a human's approaching movement, which has been stored in advance.

According to the aforementioned configuration, the movement information is unlikely to be affected by shapes (contours) of attire of the user, shoes, belongings, etc., in the image processing apparatus 100, and thereby improving the precision of detection of a user's proximity.

Preferably, the image processing apparatus 100 includes a second determining part (309) for determining whether the extracted movement information indicates a movement of a human based on human movement information (212) indicating movement of a human. Thus, error detections caused by a moving object other than the human, such as an industrial product or animals, can be reduced.

Preferably, the image processing apparatus 100 includes a human detecting part (307) for detecting coordinate information of one or more moving objects within a certain range of area (such as a sensor detection range of the human body detecting sensor). Also, the extracting part extracts the movement information of the one or more moving objects based on the detected coordinate information. Thus, the movement information items with respect to a plurality of humans can be efficiently extracted.

Preferably, the image processing apparatus 100 includes a speed calculating part (306) for calculating an approaching speed of the user detected by the first determining part (308), thereby controlling the image processing apparatus 100 based on the calculated approaching speed. Thus, the image processing apparatus 100 can control the image processing apparatus 100, such as canceling the power saving state, and displaying the authentication screen or the welcome screen, at a suitable timing in accordance with the approaching speed of the user.

Preferably, the image processing apparatus 100 includes a third determining part (310) for determining whether the user is leaving based on the extracted movement information and information (210) indicating movement of the human separating from the image processing apparatus 100, which has been stored in advance. Also, the image processing apparatus 100 performs the control based on the determination result of the third determining part (310). Thus, the image processing apparatus 100 can perform controls, such as the log-out operation, the power saving state transition operation, the initialization operation, etc., at a suitable timing in accordance with the movement of the user separating from the image processing apparatus 100.

Additionally, in the summary, the reference numerals are added for convenience of understanding, which are showing an example and are not limiting the scope of the invention.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth. The present application is based on Japanese Priority Application No. 2014-196138 filed on Sep. 26, 2014, the entire contents of which are hereby incorporated herein by reference.

What is claimed is:

1. An image processing apparatus comprising:
- a memory storing computer-readable instructions; and
- a processor configured to execute the computer-readable instructions to,
  - sequentially capture a plurality of images;
  - extract movement information from the sequentially captured plurality of images through an analysis, wherein the extracted movement information relates to movement of a moving object and the sequentially captured plurality of images contain images of the moving object;
  - detect an approaching user based on the extracted movement information and approaching movement information, the approaching movement information being stored in advance and indicating movement of a user approaching the image processing apparatus; and
  - perform authentication control of the image processing apparatus for controlling a transition from a user log-out state to a user log-in state in response to detecting the approaching user, performing the authentication control including causing an authentication information input screen to be displayed for prompting the approaching user to input at least one form of authentication information for logging into the image processing apparatus.

2. The image processing apparatus as claimed in claim 1, wherein the processor is further configured to execute the computer-readable instructions to:
- calculate a level of similarity between the extracted movement information and human movement information, the human movement information being stored in advance and indicating movement of a human;
- determine that the movement of the moving object indicates movement of a human in response to the calculated level of similarity between the extracted movement information and the human movement information reaching or exceeding a threshold human movement value
- calculate a level of similarity between the extracted movement information and the approaching movement information in response to determining that the movement of the moving object indicates the movement of a human; and
- determine that the movement of a human indicates movement of a user approaching the image processing apparatus in response to the calculated level of similarity between the extracted movement information and the approaching movement information reaching or exceeding a threshold approaching movement value.

3. The image processing apparatus as claimed in claim 1, wherein the image processing apparatus further includes at least one human body detecting sensor, and wherein the processor is further configured to execute the computer-readable instructions to:

detect coordinate information of two or more moving objects within a certain sensor detection range of the at least one human body detecting sensor;

extract respective movement information of each of the two or more moving objects from the sequentially captured plurality of images on a moving object-by-moving object basis by using the detected coordinate information; and determine that the respective movement information of at least one of the two or more moving objects indicates the movement of the user approaching the image processing apparatus.

4. The image processing apparatus as claimed in claim 1, wherein the processor is further configured to execute the computer-readable instructions to:

calculate an approaching speed of the approaching user based on the extracted movement information; and perform the authentication control of the image processing apparatus for controlling the transition from the user log-out state to the user log-in state in response to the calculated approaching speed reaching or exceeding a threshold approaching speed value, in addition to detecting the approaching user.

5. The image processing apparatus as claimed in claim 1, wherein the processor is further configured to execute the computer-readable instructions to:

calculate a level of similarity between the extracted movement information and leaving movement information, the leaving movement information being stored in advance and indicating movement of a user separating from the image processing apparatus;

detect a separating user in response to the calculated level of similarity between the extracted movement information and the leaving movement information reaching or exceeding a threshold leaving movement value; and perform authentication control of the image processing apparatus for controlling a transition from the user log-in state to the user log-out state in response to detecting the separating user, performing the authentication control including causing the separating user to be logged out from the image processing apparatus.

6. The image processing apparatus as claimed in claim 1, wherein the extracted movement information includes vector information indicating respective motions of each of a plurality of small areas included in the sequentially captured plurality of images, the sequentially captured plurality of images having been divided into the plurality of the small areas.

7. The image processing apparatus as claimed in claim 1, wherein the extracted movement information includes vector information indicating correlation amounts between the sequentially captured plurality of images.

8. The image processing apparatus as claimed in claim 1, wherein the processor is further configured to execute the computer-readable instructions to generate the approaching movement information by analyzing a plurality of types of movement when the user is approaching the image processing apparatus from a certain distant position.

9. A non-transitory computer-readable recording medium having stored therein a program for causing a computer processor controlling an image processing apparatus to:

sequentially capture a plurality of images;

extract movement information from the sequentially captured plurality of images through an analysis, wherein the extracted movement information relates to movement of a moving object and the sequentially captured plurality of images contain images of the moving object;

detect an approaching user based on the extracted movement information and approaching movement information, the approaching movement information being stored in advance and indicating movement of a user approaching the image processing apparatus; and perform authentication control of the image processing apparatus for controlling a transition from a user log-out state to a user log-in state in response to detecting the approaching user, performing the authentication control including causing an authentication information input screen to be displayed for prompting the user to input at least one form of authentication information for logging into the image processing apparatus.

10. A method of controlling an image processing apparatus, the method comprising:

sequentially capturing a plurality of images;

extracting movement information from the sequentially captured plurality of images through an analysis, wherein the extracted movement information relates to movement of a moving object and the sequentially captured plurality of images contain images of the moving object;

detecting an approaching user based on the extracted movement information and approaching movement information, the approaching movement information being stored in advance and indicating movement of a user approaching the image processing apparatus; and performing authentication control of the image processing apparatus for controlling a transition from a user log-out state to a user log-in state in response to detecting the approaching user, performing the authentication control including causing an authentication information input screen to be displayed for prompting the user to input at least one form of authentication information for logging into the image processing apparatus.

11. The image processing apparatus as claimed in claim 1, wherein the processor is further configured to execute the computer-readable instructions to:

detect two or more moving objects included in the sequentially captured plurality of images to determine coordinate information of the two or more moving objects;

divide the sequentially captured plurality of images into respective divided areas on a moving object-by-moving object basis by using the determined coordinate information;

extract respective movement information of each of the two or more moving objects from the respective divided areas; and determine that the respective movement information of at least one of the two or more moving objects indicates the movement of the user approaching the image processing apparatus.

12. The image processing apparatus as claimed in claim 5, wherein the processor is further configured to execute the computer-readable instructions to:

determine whether a log-out timer value has expired in response to detecting the separating user; and perform the authentication control of the image processing apparatus for controlling the transition from the user log-in state to the user log-out state in response to determining that the log-out timer value has expired, in addition to detecting the separating user.

13. The image processing apparatus as claimed in claim 1, wherein the image processing apparatus further includes a plurality of image capturing devices, each of the plurality of image capturing devices being configured with one or more of different locations, different directions, and different capturing ranges as compared to each other, and wherein the processor is further configured to execute the computer-readable instructions to:

calibrate the plurality of image capturing devices by adjusting respective parameters of one or more of the plurality of image capturing devices such that respective coordinate systems of each of the plurality of image capturing devices become coincident with respect to a same object captured by each of the plurality of image capturing devices;

acquire the sequentially captured plurality of images from each of the plurality of image capturing devices;

complement an area included in a blind angle of at least one image capturing device of the plurality of image capturing devices by using images acquired from another image capturing device of the plurality of image capturing devices to obtain complemented single-viewpoint images; and extract the movement information from the complemented single-viewpoint images, wherein the extracted movement information relates to the movement of the moving object even in the area included in the blind angle of the at least one image capturing device.

14. The image processing apparatus as claimed in claim 13, wherein the processor is further configured to execute the computer-readable instructions to:

combine the sequentially captured plurality of images acquired from each of the plurality of image capturing devices to generate multi-viewpoint images; and extract the movement information from the generated multi-viewpoint images.

15. The image processing apparatus as claimed in claim 5, wherein the processor is further configured to execute the computer-readable instructions to generate the leaving movement information by analyzing a plurality of types of movement when the user is separating from the image processing apparatus to a certain distant position.

16. The image processing apparatus as claimed in claim 1, wherein the processor is further configured to execute the computer-readable instructions to:

perform power control for controlling a transition from a power saving state to an operational state in which the approaching user can use the image processing apparatus in response to detecting the approaching user.

17. The image processing apparatus as claimed in claim 5, wherein the processor is further configured to execute the computer-readable instructions to:

perform power control for controlling a transition from an operational state to a power saving state in which the separating user cannot use the image processing apparatus in response to detecting the separating user.

18. The image processing apparatus as claimed in claim 17, wherein the processor is further configured to execute the computer-readable instructions to:

determine whether a power saving timer value has expired in response to detecting the separating user; and perform the power control for controlling the transition from the operational state to the power saving state in response to determining that the power saving timer value has expired, in addition to detecting the separating user.

* * * * *